US011223449B2

United States Patent
Zhao et al.

(10) Patent No.: US 11,223,449 B2
(45) Date of Patent: Jan. 11, 2022

(54) DATA RETRANSMISSION METHOD AND DEVICE

(71) Applicant: CHINA ACADEMY OF TELECOMMUNICATIONS TECHNOLOGY, Beijing (CN)

(72) Inventors: Yali Zhao, Beijing (CN); Jiamin Liu, Beijing (CN); Fangli Xu, Beijing (CN); Bertrand Pierre, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 5 days.

(21) Appl. No.: 16/316,341

(22) PCT Filed: Jul. 7, 2017

(86) PCT No.: PCT/CN2017/092248
§ 371 (c)(1),
(2) Date: Jan. 8, 2019

(87) PCT Pub. No.: WO2018/006871
PCT Pub. Date: Jan. 11, 2018

(65) Prior Publication Data
US 2019/0238274 A1 Aug. 1, 2019

(30) Foreign Application Priority Data

Jul. 8, 2016 (CN) .......................... 201610539425.9

(51) Int. Cl.
*H04L 1/18* (2006.01)
*H04W 76/15* (2018.01)
(Continued)

(52) U.S. Cl.
CPC .............. *H04L 1/1809* (2013.01); *H04L 1/18* (2013.01); *H04W 8/22* (2013.01); *H04W 24/10* (2013.01);
(Continued)

(58) Field of Classification Search
CPC ....... H04L 1/1809; H04L 1/18; H04L 1/1642; H04W 76/15; H04W 8/22; H04W 24/10; H04W 80/02
See application file for complete search history.

(56) References Cited

U.S. PATENT DOCUMENTS

2015/0326456 A1* 11/2015 Dudda ................... H04L 47/27
370/252
2017/0013650 A1 1/2017 Fujishiro et al.
2018/0139014 A1* 5/2018 Xiong .................. H04L 1/1861

FOREIGN PATENT DOCUMENTS

CN          1428949 A    7/2003
CN        102893547 A    1/2013
(Continued)

OTHER PUBLICATIONS

Ericsson, "PDCP for split bearer in dual connectivity," 3GPP TSG-RAN WG2 #87, Aug. 18-22, 2014, 5pgs., Dresden, Germany.
(Continued)

*Primary Examiner* — Eric Myers
(74) *Attorney, Agent, or Firm* — Womble Bond Dickinson (US) LLP

(57) ABSTRACT

A data retransmission method and device are provided to resolve a problem of lacking in a retransmission scheme supporting retransmission via different connections in the prior art. In one embodiment of the invention, the method comprises: upon determining that a transmission node corresponding to a terminal satisfies a multi-transmission node retransmission criterion, selecting, by a target protocol layer in a transmitting device and responsible for managing transmission via multiple transmission nodes, and for a retransmission data packet corresponding to the terminal, at least one transmission node; and performing, via the selected transmission node, data packet retransmission. The embodiment is employed to select, upon determining that a trans-
(Continued)

Lower bound                        Upper bound mission node corresponding to a terminal satisfies the multi-transmission node retransmission criterion, and for a retransmission data packet corresponding to the terminal, at least one transmission node, thereby implementing retransmission via different connects, further increasing reliability and throughput of transmission in a system.

18 Claims, 3 Drawing Sheets

(51) Int. Cl.
    *H04W 8/22*     (2009.01)
    *H04W 24/10*     (2009.01)
    *H04W 80/02*     (2009.01)
    *H04L 1/16*     (2006.01)

(52) U.S. Cl.
    CPC ........... *H04W 76/15* (2018.02); *H04W 80/02* (2013.01); *H04L 1/1642* (2013.01)

(56) References Cited

FOREIGN PATENT DOCUMENTS

| | | |
|---|---|---|
| CN | 104333908 A | 2/2015 |
| CN | 105530077 A | 4/2016 |
| CN | 105612804 A | 5/2016 |
| JP | 2010226625 A | 10/2010 |
| JP | 2011509041 A | 3/2011 |
| JP | 2012512582 A | 5/2012 |
| JP | 2014042342 A | 3/2014 |
| WO | 2015141846 A1 | 3/2015 |
| WO | 2015/171262 A1 | 11/2015 |

OTHER PUBLICATIONS

The Extended European Search Report for PCT Application No. PCT/CN2017092248 dated Jun. 19, 2019, 10 pgs.
The Official Chinese Office Action for Application No. 2016105394259 dated Jun. 13, 2019, 9 pgs.
ZTE, "Considering on the user plane for the tight interworking between NR and LTE," 3GPP TSG-RAN2 Meeting #93bis, Apr. 11-15, 2016, 6 pgs., Dubrovnik, Croatia.
English Translation of the International Search Report for International Application No. PCT/CN2017/092248 dated Sep. 27, 2017.
International Search Report and the Written Opinion of the International Searching Authority for International Application No. PCT/CN2017/092248 dated Sep. 27, 2017 (Chinese Language).
The Office Action for Japanese Application No. 2019500579 dated Feb. 18, 2020, 4 pages.
The International Preliminary Report on Patentability for PCT Application No. PCT/CN2017/092248 dated Jan. 8, 2019, 5 pages.
The First Office Action for Japanese Application No. 2019-500579 dated Nov. 4, 2020, 10 pages.

\* cited by examiner

DATA RETRANSMISSION METHOD AND DEVICE

This patent application is a U.S. National Phase Application Under 35 U.S.C. § 371 of International Application No. PCT/CN2017/092248, filed Jul. 7, 2017, entitled "Data Retransmission Method and Device", which claims the benefit of priority of Chinese Patent Application No. 201610539425.9, filed with the Chinese Patent Office on Jul. 8, 2016, entitled "A method and device for retransmitting data", which was incorporated by reference in the entirety.

FIELD

The present invention relates to the field of wireless communications, and particularly to a method and device for retransmitting data.

BACKGROUND

There are generally three categories of services in future mobile communication systems:
enhanced Mobile Broadband (eMBB) communication;
massive Machine Type Communication (mMTC); and
Ultra-Reliable and Low Latency Communication (URLLC).

Ultra-dense networking is a trend in the developing future mobile communication systems, and in order to manage a large number of distributed processing nodes centrally at the control plane in the case of ultra-dense networking, a part of protocol functions shall be performed centrally, thus resulting in a dual-layer architecture including a centralized processing node and distributed processing node, where the distributed processing node are also referred to Transmission and Reception Points (TRPs), and the centralized processing node can be subdivided into a control plane of the centralized processing node, and a user plane of the centralized processing node according to their different functions.

Dual connectivity refers to concurrent connections between a terminal and two base stations so that the terminal can transmit data with the two base stations. FIG. 1 illustrates an architecture diagram of a user plane of dual connectivity.

For dual connectivity in the 3GPP Rel-12/13, only retransmission of data in response to an Automatic Repeat Request (ARQ) at a Radio Link Control (RLC) layer in each transmission node is supported, but retransmission of data across different transmission nodes is not supported.

Dual connectivity in a 5G system is typically different from dual connectivity in the 3GPP Rel-12/13 in that it is very likely for a part of a plurality of frequencies corresponding to multiple connections in the 5G system to be high frequencies (e.g., 6 GHz) or to lie in an unlicensed spectrum. A transmission characteristic at the high frequencies and in the unlicensed spectrum is different from that at traditional Long Term Evolution (LTE) frequencies, and a signal may be transmitted intermittently, so it is desirable to support an ARQ mechanism across different connections in the 5G system.

In summary, there has been absent so far a retransmission solution across different connections.

SUMMARY

The invention provide a method and device for retransmitting data so as to address the problem in the prior art of a retransmission solution across different connections.

An embodiment of the invention provides a method for retransmitting data, the method including:
selecting, by a target protocol layer, in a transmission device, responsible for managing transmission across transmission nodes, at least one transmission node for data packets, to be retransmitted, corresponding to a terminal upon determining that a transmission node corresponding to the terminal satisfies a condition for retransmission across transmission nodes; and retransmitting, by the target protocol layer in the transmission device, the data packets through a selected transmission nod.

Optionally, the data packets to be retransmitted include PDUs and/or PDU segments corresponding to the target protocol layer.

Optionally, retransmitting, by the target protocol layer in the transmission device, the data packets through the selected transmission node includes:
transmitting, by the target protocol layer in the transmission device, the data packets to be retransmitted, to the selected transmission node so that the transmission node transmits received data packets to be retransmitted.

Optionally, the transmission device is a network-side device; and
before selecting, by the target protocol layer in the transmission device, at least one transmission node for data packets, to be retransmitted, corresponding to the terminal, the method further includes:
determining, by the target protocol layer in the transmission device, that the terminal supports a function of retransmission across transmission nodes, according to a capability report of the terminal.

Optionally, the transmission device is a network-side device; and
before selecting, by the target protocol layer in the transmission device, at least one transmission node for data packets, to be retransmitted, corresponding to the terminal, the method further includes:
instructing, by the transmission device, the terminal to enable a function of uplink and/or downlink retransmission across transmission nodes.

Optionally, the condition for enabling retransmission across transmission nodes includes at least one of followings:
the target protocol layer in the transmission device determines that there is a data packet failing to be transmitted, according to a received status report from a lower layer;
the target protocol layer in the transmission device determines that there is a data packet failing to be transmitted, according to a received status report from a reception device; or the target protocol layer in the transmission device determines that there is a data packet failing to be transmitted, after a retransmission timer expires.

Optionally, the status report of the reception device is transmitted by a counterpart protocol layer, in the reception device, of the target protocol layer in the transmission device upon reception of a PDU including a probing instruction; or
the status report of the reception device is transmitted by a counterpart protocol layer, in the reception device, of the target protocol layer in the transmission device upon detecting a PDU loss; or
the status report of the reception device is transmitted by a counterpart protocol layer, in the reception device, of the target protocol layer in the transmission device upon reception of a PDU segment loss indicator transmitted by the lower layer.

Optionally, the status report of the reception device is based upon target protocol layer PDUs, or PDU segments corresponding to the target protocol layer PDUs.

Optionally, selecting, by the target protocol layer in the transmission device, at least one transmission node for data packets, to be retransmitted, corresponding to the terminal includes:

selecting, by the target protocol layer in the transmission device, at least one of the other transmission nodes corresponding to the terminal than a specific transmission node, wherein the specific transmission node is a transmission node, which fails to transmit data, and for which a current link has not been resumed.

Optionally, before selecting, by the target protocol layer in the transmission device, at least one transmission node for data packets, to be retransmitted, corresponding to the terminal, the method further includes:

selecting, by the target protocol layer in the transmission device, at least one transmission node for the data packets, to be retransmitted, corresponding to the terminal upon determining that the number of transmission nodes participating in retransmission does not exceed N, wherein N is a positive integer; and/or selecting, by the target protocol layer in the transmission device, at least one transmission node for the data packets, to be retransmitted, corresponding to the terminal upon determining that a retransmission stop timer corresponding to the data packets to be retransmitted does not expire.

Optionally, the method further includes:

selecting, by the target protocol layer in the transmission device, data packets to be initially transmitted, or data packets to be retransmitted, by the transmission node, in a transmission window in an ascending order of their SNs.

Optionally, a lower bound of the transmission window is a sum of a largest one of SNs in data packets decided by the transmission device to discard and SNs in correctly received data packets, and a step value; and a length of the transmission window is a preset length.

Optionally, the method further includes:

performing, by the target protocol layer in the transmission device, a window pulling operation on the transmission window after a window-pulling condition is satisfied;

wherein the window-pulling condition includes at least one of followings:

a retransmission stop timer of a PDU corresponding to the lower bound of the transmission window expires;

a PDU corresponding to the lower bound of the transmission window is retransmitted through N transmission nodes, but fails to be retransmitted, wherein N is a positive integer; or a PDU corresponding to the lower bound of the transmission window is transmitted successfully.

Optionally, the method further includes:

if the data packets to be transmitted include data packets to be initially transmitted, and data packets to be retransmitted, then preferentially transmitting, by the transmission device, the data packets to be retransmitted.

An embodiment of the invention provides a transmission device for retransmitting data, the transmission device including: a processing module and a transmitting module, wherein the processing module and the transmitting module are located at a target protocol layer responsible for managing retransmission across transmission nodes;

the processing module is configured to select at least one transmission node for data packets, to be retransmitted, corresponding to a terminal upon determining that a transmission node corresponding to the terminal satisfies a condition for retransmission across transmission nodes; and the transmitting module is configured to retransmit the data packets through the transmission node selected by the processing module.

Optionally, the data packets to be retransmitted include PDUs and/or PDU segments corresponding to the target protocol layer.

Optionally, the transmitting module is configured:

to transmit the data packets to be retransmitted, to the selected transmission node so that the transmission node transmits the received data packets to be retransmitted.

Optionally, the transmission device is a network-side device; and the processing module is further configured:

to select at least one transmission node for the data, to be retransmitted, corresponding to the terminal upon determining that the terminal supports a function of retransmission across transmission nodes, according to a capability report of the terminal.

Optionally, the transmission device is a network-side device; and the processing module is further configured:

to select at least one transmission node for the data, to be retransmitted, corresponding to the terminal after instructing the terminal to enable a function of uplink and/or downlink retransmission across transmission nodes.

Optionally, the condition for enabling retransmission across transmission nodes includes at least one of followings:

it is determined that there is a data packet failing to be transmitted, according to a received status report from a lower layer;

it is determined that there is a data packet failing to be transmitted, according to a received status report from a reception device; and it is determined that there is a data packet failing to be transmitted, after a retransmission timer expires.

Optionally, the status report of the reception device is transmitted by a counterpart protocol layer, in the reception device, of the target protocol layer in the transmission device upon reception of a PDU including a probing instruction; or the status report of the reception device is transmitted by a counterpart protocol layer, in the reception device, of the target protocol layer in the transmission device upon detecting a PDU loss; or the status report of the reception device is transmitted by a counterpart protocol layer, in the reception device, of the target protocol layer in the transmission device upon reception of a PDU segment loss indicator transmitted by the lower layer.

Optionally, the status report of the reception device is based upon target protocol layer PDUs, or PDU segments corresponding to the target protocol layer PDUs.

Optionally, the processing module is configured:

to select at least one of the other transmission nodes corresponding to the terminal than a specific transmission node, wherein the specific transmission node is a transmission node, which fails to transmit data, and for which a current link has not been resumed.

Optionally, the processing module is further configured:

to select at least one transmission node for the data packets, to be retransmitted, corresponding to the terminal upon determining that the number of transmission nodes participating in retransmission does not exceed N, wherein N is a positive integer; and/or to select at least one transmission node for the data packets, to be retransmitted, corresponding to the terminal upon determining that a retransmission stop timer corresponding to the data packets to be retransmitted does not expire.

Optionally, the transmitting module is further configured:

to select data packets to be initially transmitted, or data packets to be retransmitted, by the transmission node, in a transmission window in an ascending order of their SNs.

Optionally, a lower bound of the transmission window is a sum of a largest one of SNs in data packets decided by the transmission device to discard and SNs in correctly received data packets, and a step value; and a length of the transmission window is a preset length.

Optionally, the transmitting module is further configured:

to perform a window pulling operation on the transmission window after a window-pulling condition is satisfied;

wherein the window-pulling condition includes at least one of followings:

a retransmission stop timer of a PDU corresponding to the lower bound of the transmission window expires;

a PDU corresponding to the lower bound of the transmission window is retransmitted through N transmission nodes, but fails to be retransmitted, wherein N is a positive integer; or a PDU corresponding to the lower bound of the transmission window is transmitted successfully.

Optionally, the transmitting module is further configured:

if the data packets to be transmitted include data packets to be initially transmitted, and data packets to be retransmitted, to preferentially transmit the data packets to be retransmitted.

An embodiment of the invention provides another transmission device for retransmitting data, the transmission device including:

a processor located at a target protocol layer responsible for managing transmission across transmission nodes, and configured to read and execute program in a memory:

to select at least one transmission node for data packets, to be retransmitted, corresponding to a terminal upon determining that a transmission node corresponding to the terminal satisfies a condition for retransmission across transmission nodes; and to retransmit the data packets through a selected transmission node; and a transceiver configured to receive and transmit data under the control of the processor.

In the embodiments of the invention, the target protocol layer, in the transmission device, responsible for managing transmission across transmission nodes selects at least one transmission node for the data packets, to be retransmitted, corresponding to a terminal upon determining that the transmission node corresponding to the terminal satisfies the condition for retransmission across transmission nodes, and retransmits the data packets through the selected transmission node. Since at least one transmission node can be selected for the data packets, to be retransmitted, corresponding to a terminal upon determining that the transmission node corresponding to the terminal satisfies the condition for retransmission across transmission nodes, data can be retransmitted across different connections.

Furthermore the transmission reliability and throughput of the system can also be improved.

BRIEF DESCRIPTION OF THE DRAWINGS

In order to make the technical solutions according to the embodiments of the invention more apparent, the drawings to which reference is to be made in the description of the embodiments will be introduced below in brief, and apparently the drawings to be described below illustrate only some embodiments of the invention, and based upon the drawings here, other drawings will occur to those ordinarily skilled in the art without any inventive effort.

DETAILED DESCRIPTION OF THE EMBODIMENTS

In order to make the objects, technical solutions, and advantages of the invention more apparent, the invention will be described below in further details with reference to the drawings, and apparently the embodiments described below are only a part but not all of the embodiments of the invention. Based upon the embodiments here of the invention, all the other embodiments which can occur to those ordinarily skilled in the art without any inventive effort shall fall into the scope of the invention.

Figure 1:
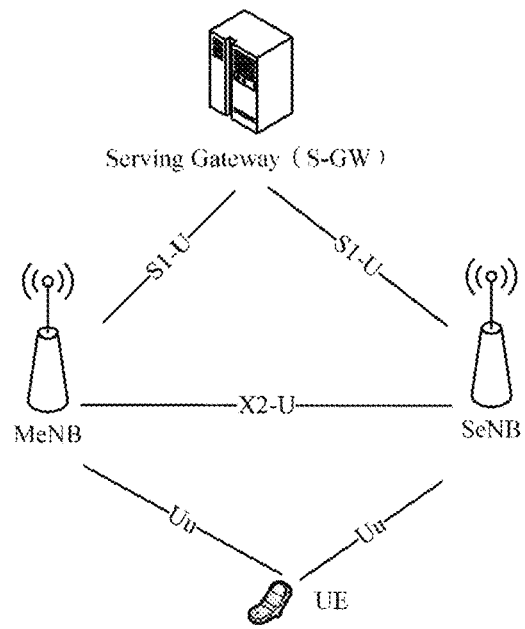
FIG. 1 is an architectural diagram of the user plane of dual connectivity in the prior art.
Figure 2:
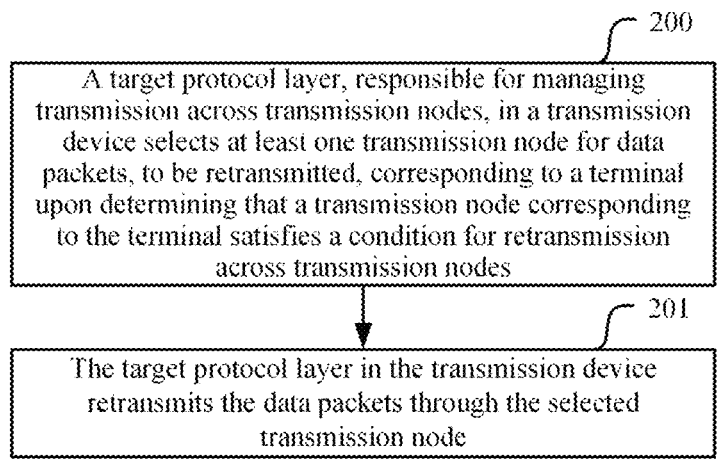
FIG. 2 is a schematic flow chart of a method for retransmitting data according to an embodiment of the invention.

As illustrated in FIG. 2, a method for retransmitting data according to an embodiment of the invention includes:

in the step 200, a target protocol layer, responsible for managing transmission across transmission nodes, in a transmission device selects at least one transmission node for data packets, to be retransmitted, corresponding to a terminal upon determining that a transmission node corresponding to the terminal satisfies a condition for retransmission across transmission nodes; and in the step 201, the target protocol layer in the transmission device retransmits the data packets through the selected transmission node.

In a particular implementation, the target protocol layer responsible for managing transmission across transmission nodes can be arranged in the transmission device, and the target protocol layer selects at least one transmission node for the data packets, to be retransmitted, corresponding to a terminal upon determining that the transmission node corresponding to the terminal satisfies the condition for retransmission across transmission nodes, and retransmits the data packets through the selected transmission node. Since at least one transmission node can be selected for the data packets, to be retransmitted, corresponding to a terminal upon determining that the transmission node corresponding to the terminal satisfies the condition for retransmission across transmission nodes, data can be retransmitted across different connections; and furthermore the transmission reliability and throughput of the system can also be improved.

Particularly, the target protocol layer can be a logic protocol layer embodied in software, and can obtain transmission states from different nodes, and then decide centrally whether to retransmit data across the nodes. Of course, this function can alternatively be attached to and performed by another logic unit or physical entity as readily occur to those skilled in the art, although the target protocol layer will be arranged as described in the following implementation.

As for "determining that the transmission node corresponding to the terminal satisfies the condition for retransmission across transmission nodes", data are retransmitted across different transmission carriers, or transmission and reception points at the network side, from the perspective of the network side, and different configured transmission channels, which can be characterized as logic channels, different RLC entities, etc., from the perspective of the UE side.

As for "selecting at least one transmission node for the data packets, to be retransmitted, corresponding to the terminal", the data packets, to be retransmitted, corresponding to the terminal refer to data packets retransmitted to the terminal, or retransmitted by the terminal.

If the transmission device is a network-side device, then a reception device will be a terminal; and if the transmission device is a terminal, then the reception device will be a network-side device.

Here the network-side device according to the embodiment of the invention can be a base station (e.g., a macro base station, a home base station, etc.) or another network-side device. The terminal according to the embodiment of the invention can be a mobile phone, a PAD, etc.

The target protocol layer in the transmission device retransmits the data packets to be retransmitted, which can include Packet Data Units (PDUs) corresponding to the target protocol layer, or can include PDU segments corresponding to the target protocol layer, or can include PDUs and PDU segments corresponding to the target protocol layer.

Optionally, the target protocol layer in the transmission device transmits the data to be retransmitted, through the selected transmission node particularly by transmitting the data to be retransmitted, to the selected transmission node so that the transmission node transmits the received data to be retransmitted.

If the transmission device is a network-side device, then the target protocol layer in the transmission device will select at least one transmission node for the data, to be retransmitted, corresponding to the terminal upon determining that the terminal supports a function of retransmission across transmission nodes, according to a capability report of the terminal.

Retransmission across nodes in the prior may occur during a handover, but this process involves an RRC procedure, thus slowing down the retransmission process. Retransmission across nodes in the embodiment of the invention corresponds to an underlying process which does not involve any RRC procedure. This function generally can improve the success ratio and speed of transmitting data when a plurality of nodes are configured to provide a UE concurrently with a traffic transmission service.

Stated otherwise, the terminal needs to report to the network side whether it supports the function of retransmission across transmission nodes.

If the transmission device is a terminal, then the transmission device will report to the network side whether it supports the function of retransmission across transmission nodes.

For example, one bit can be used as a capability indicator to indicate that the terminal supports retransmission across transmission nodes, where 1 represents Support, and 0 represents No Support.

If the transmission device is a network-side device, then the transmission device will select at least one transmission node for the data, to be retransmitted, corresponding to the terminal after instructing the terminal to enable a function of uplink and/or downlink retransmission across transmission nodes.

Here the network-side device can decide whether to transmit data through a plurality of transmission nodes, according to the amount of data of the terminal, and decide whether to enable the function of retransmission across transmission nodes for the terminal only upon deciding to transmit data through a plurality of transmission nodes for the terminal.

Whether to enable the function of retransmission across transmission nodes can be decided according to one or a combination of the following factors:

a capability of the terminal;

frequencies corresponding to a plurality of connections for the terminal; and a type of traffic for the terminal.

For example, when the network side decides to transmit data through a plurality of transmission nodes for the terminal, the capability of the terminal supports retransmission across transmission nodes, an acknowledged mode (the AM mode) is applied to traffic to be transmitted, at the access stratum, and one of the transmission nodes corresponds to a high frequency, the network side can decide to enable the function of retransmission across transmission nodes for the terminal.

If the transmission device is a terminal, then the transmission device will select at least transmission node for the data packets, to be retransmitted, corresponding to the terminal after enabling the function of uplink and/or downlink retransmission across transmission nodes according to a received instruction from the network-side device.

Optionally, the condition for enabling retransmission across transmission nodes according to the embodiment of the invention can include a part or all of the following conditions:

a first condition that the target protocol layer in the transmission device determines that there is a data packet failing to be transmitted, according to a received status report from a lower layer;

a second condition that the target protocol layer in the transmission device determines that there is a data packet failing to be transmitted, according to a received status report from the reception device; and a third condition that the target protocol layer in the transmission device determines that there is a data packet failing to be transmitted, after a retransmission timer expires.

For the first condition, the lower layer in the transmission device can generate the status report according to a transmission result of a PDU and/or PDU segments, and transmit the status report to a higher layer. The status report here relates to a PDU of the target protocol layer, or PDU segments corresponding to the PDU of the target protocol layer. For example, a PDU is transmitted, and then the status report is generated for the PDU; and in another example, PDU segments are transmitted, and then the status report is generated for the PDU segments.

The status report includes information about whether the corresponding PDU and/or PDU segments are transmitted successfully.

For the second condition, the reception device can generate the status report according to a transmission result of a PDU and/or PDU segments, and transmit the status report to the transmission device. The status report here relates to a PDU of the target protocol layer, or PDU segments corresponding to the PDU of the target protocol layer. For example, a PDU is transmitted, and then the status report is generated for the PDU; and in another example, PDU segments are transmitted, and then the status report is generated for the PDU segments.

The status report includes information about whether the corresponding PDU and/or PDU segments are transmitted successfully.

Optionally, the status report of the reception device is transmitted by a counterpart protocol layer, in the reception device, of the target protocol layer in the transmission device upon reception of the PDU including a probing instruction; or the status report of the reception device is transmitted by a counterpart protocol layer, in the reception device, of the target protocol layer in the transmission device upon detecting that the PDU is lost; or the status report of the reception device is transmitted by a counterpart protocol layer, in the reception device, of the target protocol layer in the transmission device upon reception of a PDU segment loss indicator transmitted by the lower layer.

The counterpart protocol layer, in the reception device, of the target protocol layer in the transmission device is a protocol layer located at the same position as a layer where the target protocol layer of the transmission device is located.

The transmission device transmits a probing instruction to the reception device after transmitting the data packets to the reception device.

Correspondingly, the reception device returns a status report for the received data packets to the transmission device upon reception of a PDU including the probing instruction.

Optionally, there may be failures of links of transmission nodes failing to transmit data, so these transmission nodes may not be selected for transmission.

Particularly, the target protocol layer in the transmission device selects at least one of the other transmission nodes corresponding to the terminal than a specific transmission node, where the specific transmission node is a transmission node, which fails to transmit data, and for which a current link has not been resumed.

Here the transmission device can determine whether the current link of the transmission node failing to transmit data has been resumed, according to a channel quality feedback result of the UE, transmission conditions of the other data packets, etc.

The other transmission nodes above than the specific transmission node can retransmit data or can initially transmit data.

In order to avoid the target protocol layer responsible for managing transmission across transmission nodes from retransmitting data across different transmission nodes, the number N of transmission nodes allowable to retransmit a PDU can be limited, or a retransmission stop timer can be introduced for the PDU.

Particularly, the target protocol layer in the transmission device selects at least one transmission node for the data packets, to be retransmitted, corresponding to the terminal upon determining that the number of transmission nodes participating in retransmission does not exceed N, where N is a positive integer; and/or the target protocol layer in the transmission device selects at least one transmission node for the data packets, to be retransmitted, corresponding to the terminal upon determining that the retransmission stop timer corresponding to the data packets to be retransmitted does not expire.

For example, N is 11, and if the number of transmission nodes retransmitting a data packet A is 10, then the data packet A may be further retransmitted; and if the number of transmission nodes retransmitting a data packet A is 12, then the data packet A may not be further retransmitted.

Here the retransmission stop timer can be started after the data packets are initially transmitted, or can be started after the data packets are retransmitted for the first time.

In order to support retransmission across transmission nodes, the target protocol layer, in the transmission device, responsible for retransmission across transmission nodes can further maintain a transmission window. The transmission window can be maintained in a window pulling mode.

Figure 3:
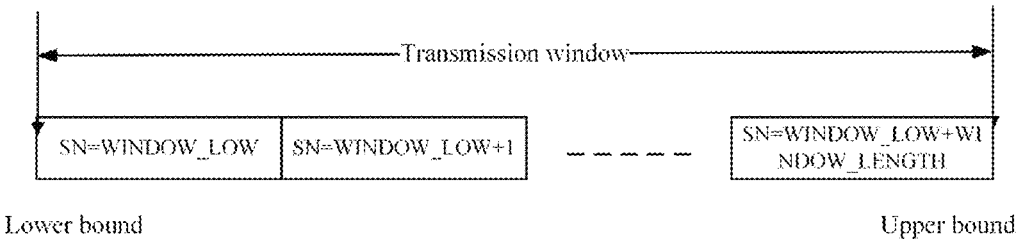
FIG. 3 is a schematic diagram of a transmission window according to an embodiment of the invention.

As illustrated in FIG. 3, a lower bound WINDOW_LOW of the transmission window is the sum of the largest one of SNs in data packets decided by the transmission device to discard, and SNs in correctly received data packets, and a step value.

The length of the transmission window is a preset length WINDOW_LENGTH.

For example, the step value is 1, so the value of the lower bound WINDOW_LOW of the transmission window is the largest one of the SNs decided by the transmission to discard, or received correctly by the receiver in consecution, plus 1.

For example, the SNs in the discarded data packets are 3 and 6, and the SNs in the correctly received data packets are 1, 2, 4, 5, and 7, so the largest SN is 7, and the value of the lower bound WINDOW_LOW of the transmission window is 7+1=8.

In another example, the SNs in the discarded data packets are 3 and 6, and the SNs in the correctly received data packets are 1, 2, 4, and 5, so the largest SN is 6, and the value of the lower bound WINDOW_LOW of the transmission window is 6+1=7.

Optionally, the transmission device performs a window pulling operation on the transmission window after a window-pulling condition is satisfied;

where the window-pulling condition is a part or all of the following conditions:

a retransmission stop timer of a PDU corresponding to the lower bound of the transmission window expires;

a PDU corresponding to the lower bound of the transmission window is retransmitted through N transmission nodes, but fails to be retransmitted, where N is a positive integer; and a PDU corresponding to the lower bound of the transmission window is transmitted successfully.

The PDU corresponding to the lower bound of the transmission window is a PDU of a data packet corresponding to the lower bound of the transmission window; and for example, the SNs in the discarded data packets are 3 and 6, and the SNs in the correctly received data packets are 1, 2, 4, 5, and 7, so the largest SN is 7, and thus the PDU corresponding to the lower bound of the transmission window is a PDU of the data packet with the SN of 7; and in another example, the SNs in the discarded data packets are 3 and 6, and the SNs in the correctly received data packets are 1, 2, 4, and 5, so the largest SN is 6, and thus the PDU corresponding to the lower bound of the transmission window is a PDU of the data packet with the SN of 6.

Optionally, the target protocol layer in the transmission device selects data packets to be initially transmitted, or data packets to be retransmitted, by the transmission node, in the transmission window in an ascending order of their SNs.

For example, there are three data packets in the transmission window, and their SNs are 6, 8, and 9, so the data packet with the SN of 6 is transmitted.

If the data packets to be transmitted include data packets to be initially transmitted, and data packets to be retransmitted, then the transmission device will preferentially transmit the data packets to be retransmitted.

In order to shorten a data retransmission delay, the number of lower-layer ARQ retransmissions can be reduced, and a Radio Link Failure (RLF) will not be triggered after the number of lower-layer ARQ retransmissions reaches the largest number.

The inventive solution will be described below in details by way of several examples.

Figure 4:
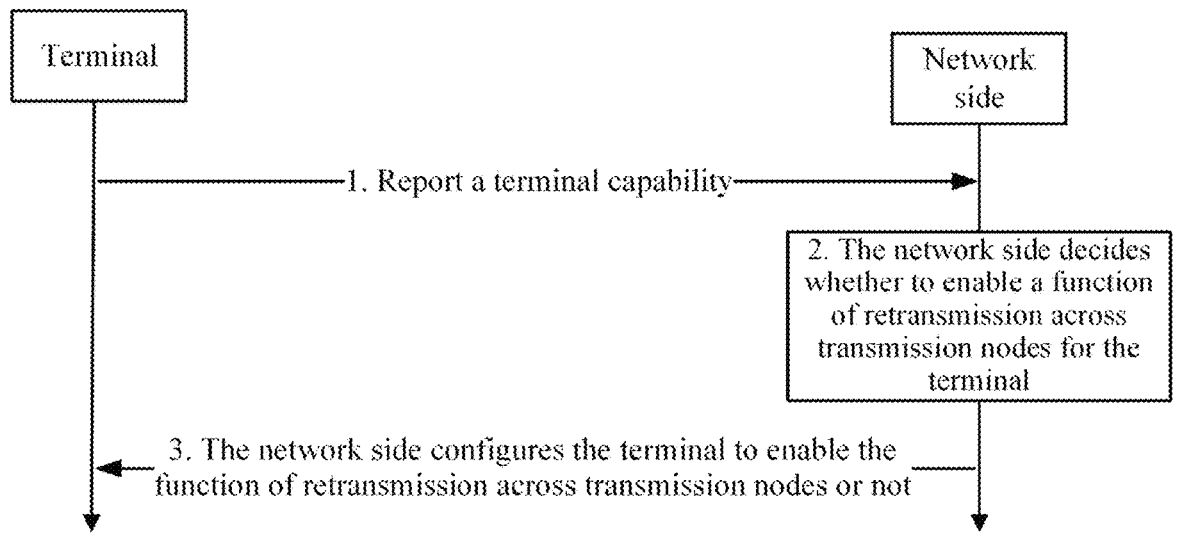
FIG. 4 is a schematic flow chart of a method for a terminal to report, and to enable a function according to an embodiment of the invention.

In a first embodiment, as illustrated in FIG. 4, a method for a terminal to report, and to enable a function according to an embodiment of the invention includes the following steps.

In the step 1, the terminal reports a terminal capability to the network side.

The terminal capability reported by the terminal carries a capability indicator to indicate whether the terminal supports retransmission across transmission nodes, and for example, one bit can be used as the capability indicator to indicate that the terminal supports retransmission across transmission nodes, where 1 represents Support, and 0 represents No Support.

In the step 2, the network side decides whether to enable a function of retransmission across transmission nodes for the terminal.

The network side decides whether to transmit data through a plurality of transmission nodes, according to the amount of data of the terminal, and decides whether to enable the function of retransmission across transmission nodes for the terminal only upon deciding to transmit data through a plurality of transmission nodes for the terminal.

Whether to enable the function of retransmission across transmission nodes can be decided according to one or a combination of the following factors:

the capability of the terminal;

frequencies corresponding to a plurality of connections for the terminal; and a type of traffic for the terminal.

For example, when the network side decides to transmit data through a plurality of transmission nodes for the terminal, the capability of the terminal supports retransmission across transmission nodes, an acknowledged mode (the AM mode) is applied to traffic to be transmitted, at the access stratum, and one of the transmission nodes corresponds to a high frequency, the network side can decide to enable the function of retransmission across transmission nodes for the terminal.

Optionally, the network side can decide whether to enable the function of retransmission across transmission nodes for the terminal based on the uplink and the downlink respectively.

In the step 3, if the network side decides to enable the function of retransmission across transmission nodes for the terminal, then the terminal will be configured to enable the function of retransmission across transmission nodes.

Once the network side decides to enable the function of retransmission across transmission nodes for the terminal in the step 2, the terminal can be configured via signaling to enable the function of retransmission across transmission nodes.

Optionally, the network side can configure the terminal based on the uplink and the downlink respectively.

In a second embodiment, retransmission across transmission nodes is triggered based upon a status report fed back from a local lower layer.

In the step 1, a transmission device transmits data.

Figure 5:
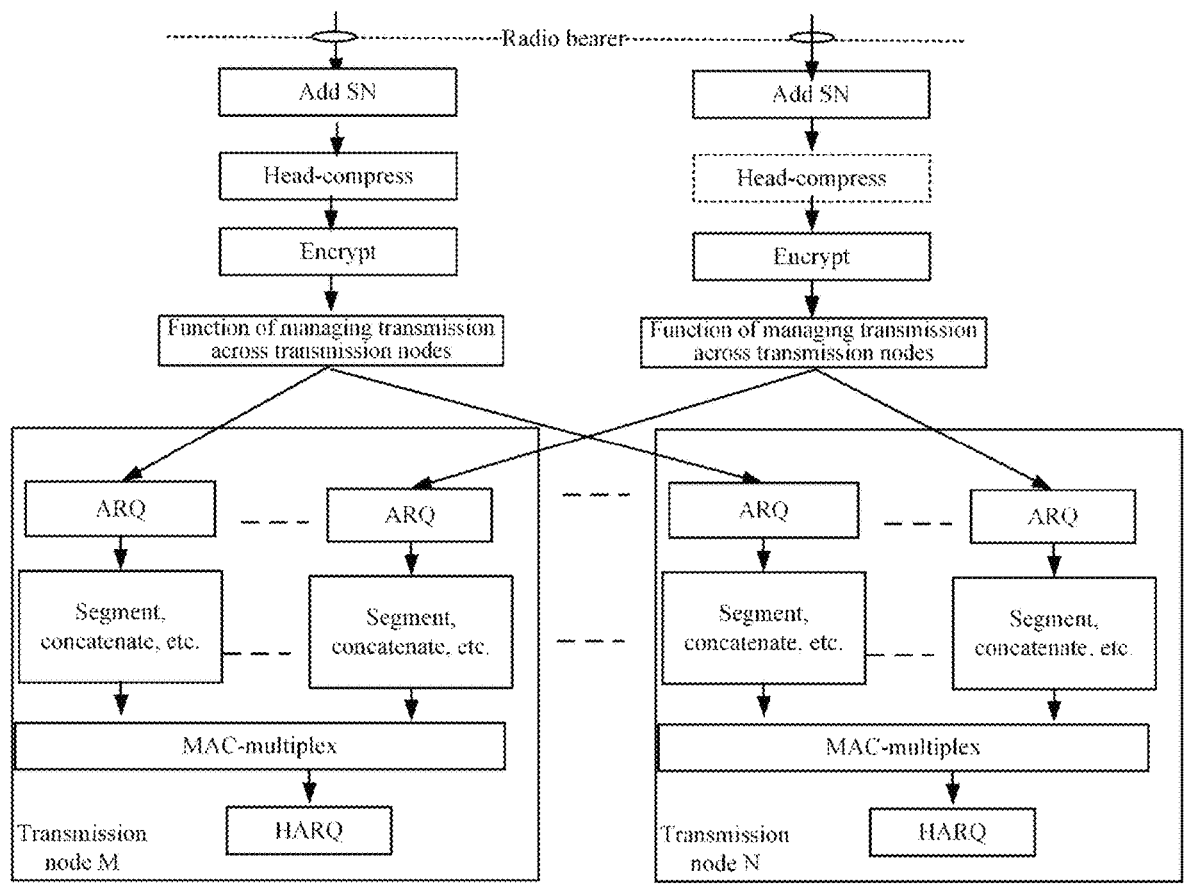
FIG. 5 is a schematic architectural diagram of a transmitter according to an embodiment of the invention.

As illustrated in FIG. 5, a transmission device to transmit data needs to one or a combination of operations of adding SNs thereto, head-compressing and encrypting the data, and duplicating or segmenting data packets, and thereafter selects at least one transmission nodes through the target protocol layer responsible for managing transmission across transmission nodes, and transmits the data packets to the selected transmission node.

Each transmission node receiving data packets performs one or a combination of operations of making an ARQ, segmenting/concatenating the data packets, and other operations, MAC-multiplexes them, and thereafter may further perform a Hybrid Automatic Repeat Request (HARQ) if necessary.

It shall be noted that FIG. 5 illustrates only a possible implementation of the architecture of the transmitter, but the embodiment of the invention will be applicable to any architecture including a target protocol layer responsible for managing transmission across transmission nodes.

When there is a transmission occasion at the lower layer, the transmission device selects PDUs to be initially transmitted or to be retransmitted across nodes, in the transmission window in an ascending order of their SNs. As illustrated in FIG. 3, for example, if a PDU with SN=WINDOW_LOW in the current transmission window is being transmitted, then if a transmission node M has a transmission occasion, then the transmission device will select a PDU with SN=WINDOW_LOW+1 for transmission, and once the PDU with SN=WINDOW_LOW+1 is delivered to the lower layer, a retransmission stop timer corresponding to the PDU can be further started.

In the step 2, the transmission device obtains local transmission state feedback.

The target protocol layer of the transmission device receives a status report from the lower layer.

In the step 3, the transmission device decides to retransmit data across nodes.

Upon determining that there is a data packet failing to be transmitted, according to a received status report from the lower layer for data packets transmitted by a transmission node M, the transmission device determines that the transmission node M fails to transmit a corresponding PDU or PDU segments, and decides to retransmit data across nodes.

Furthermore, the target protocol layer responsible for managing transmission across transmission nodes determines that there is a failure of a radio link of the transmission node, and will not transmit any new data (including data to be initially transmitted, and data to be retransmitted) through the transmission node M until it is determined that the link of the transmission node M is resumed (e.g., whether the link of the transmission node M is resumed is determined based upon a channel quality feedback result of the UE, or a transmission condition of the other data packets transmitted through the transmission node).

Also the target protocol layer selects an appropriate transmission node for the data packets to be retransmitted, and retransmit the data packets through the selected transmission node.

In this implementation, the data packets are retransmitted across nodes as per a PDU or PDU segments corresponding to the protocol layer responsible for managing transmission across transmission nodes.

Optionally, the transmission device maintains the transmission window.

Once any one of the following conditions is satisfied, a window-pulling operation is performed on the lower bound WINDOW_LOW of the transmission window, that is, WINDOW_LOW=WINDOW_LOW+1:

a retransmission stop timer of a PDU corresponding to the lower bound of the transmission window expires;

a PDU corresponding to the lower bound of the transmission window is retransmitted through N transmission nodes, but fails to be retransmitted, where N is a positive integer; and a PDU corresponding to the lower bound of the transmission window is transmitted successfully.

In a third embodiment, retransmission across transmission nodes is triggered based upon a status report of the reception device.

In the step 1, a transmission device transmits data.

As illustrated in FIG. 5, a transmission device to transmit data needs to one or a combination of operations of adding SNs thereto, head-compressing and encrypting the data, and duplicating or segmenting data packets, and thereafter selects at least one transmission nodes through the target protocol layer responsible for managing transmission across transmission nodes, and transmits the data packets to the selected transmission node.

Each transmission node receiving data packets performs one or a combination of operations of making an ARQ, segmenting/concatenating the data packets, and other operations, MAC-multiplexes them, and thereafter may further perform an HARQ if necessary.

When there is a transmission occasion at the lower layer, the transmission device selects PDUs to be initially transmitted or to be retransmitted across nodes, in the transmission window in an ascending order of their SNs. As illustrated in FIG. 3, for example, if a PDU with SN=WINDOW_LOW in the current transmission window is being transmitted, then if a transmission node M has a transmission occasion, then the transmission device will select a PDU with SN=WINDOW_LOW+1 for transmission, and once the PDU with SN=WINDOW_LOW+1 is delivered to the lower layer, a retransmission stop timer corresponding to the PDU can be further started.

In the step 2, the transmission device obtains local transmission state feedback.

The target protocol layer of the transmission device receives a status report from the reception device.

Figure 6:
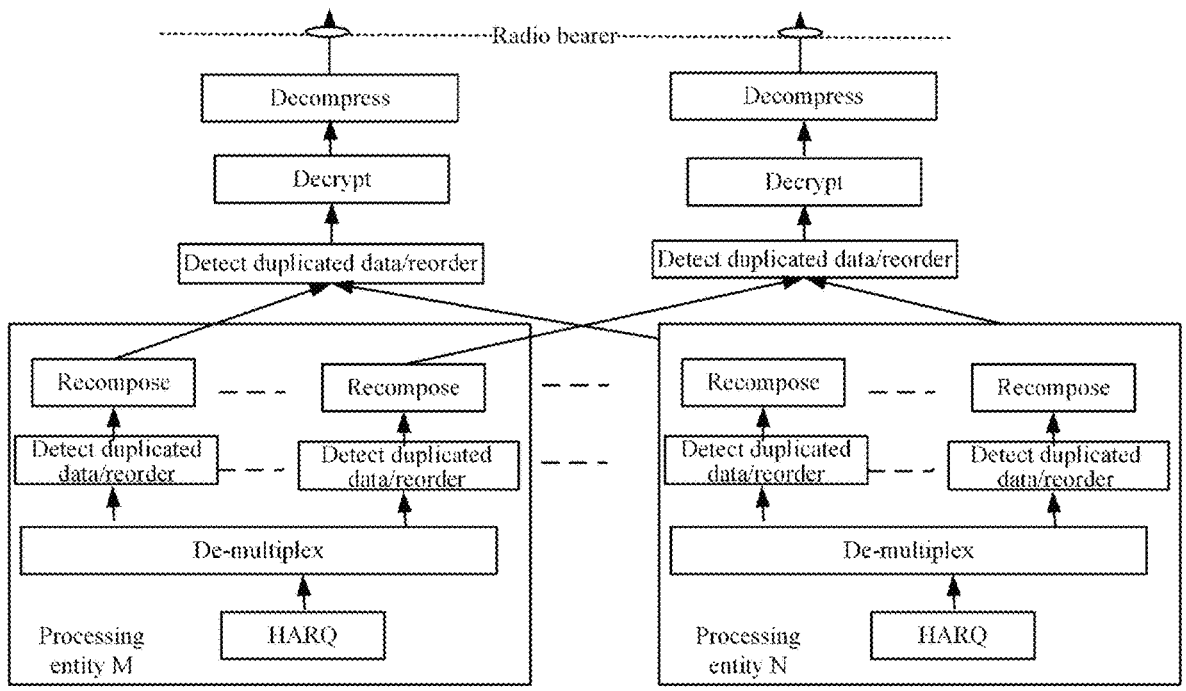
FIG. 6 is a schematic architectural diagram of a receiver according to an embodiment of the invention.

As illustrated in FIG. 6, processing entities corresponding to transmission nodes de-multiplex data received in response to an HARQ, detect duplicated data from and reorder the received data, and thereafter recompose the data. The reception device detects duplicated data packets from and reorders the data packets from the plurality of processing entities corresponding to the transmission nodes, and thereafter decrypts and decompresses the data packets.

It shall be noted that FIG. 6 illustrates only a possible implementation of the architecture of the receiver, but the embodiment of the invention will be applicable to any architecture capable of receiving data transmitted by a transmission node.

A counterpart protocol layer, in the reception device, of the target protocol layer, in the transmission device, responsible for managing transmission across transmission nodes detects duplicated data from and reorders the received data, determines a reception condition according to a reordering result, and generates and feeds back to the transmission device a status report when a feedback triggering condition is satisfied.

the feedback triggering condition includes a part or all of the following conditions:

the counterpart protocol layer, in the reception device, of the target protocol layer in the transmission device receives a PDU including a probing instruction;

the counterpart protocol layer, in the reception device, of the target protocol layer in the transmission device detects a PDU loss; and the counterpart protocol layer, in the reception device, of the target protocol layer in the transmission device receives a PDU segment loss indicator transmitted from the lower layer.

Optionally, the status report can be a PDU-based status report or can be a PDU segment-based status report.

In the step 3, the transmission device decides to retransmit data across nodes.

Upon determining that there is a data packet failing to be transmitted, according to a received status report from the reception device for data packets transmitted by a transmission node M, the transmission device determines that the transmission node M fails to transmit a corresponding PDU or PDU segments, and decides to retransmit data across nodes.

Furthermore, the target protocol layer responsible for managing transmission across transmission nodes determines that there is a failure of a radio link of the transmission node, and will not transmit any new data (including data to be initially transmitted, and data to be retransmitted) through the transmission node M until it is determined that the link of the transmission node M is resumed (e.g., whether the link of the transmission node M is resumed is determined based upon a channel quality feedback result of the UE, or a transmission condition of the other data packets transmitted through the transmission node).

Further, the target protocol layer selects an appropriate transmission node for the data packets to be retransmitted, and retransmit the data packets through the selected transmission node.

In this implementation, the data packets are retransmitted across nodes as per a PDU or PDU segments corresponding to the protocol layer responsible for managing transmission across transmission nodes.

Optionally, the transmission device maintains the transmission window.

Once any one of the following conditions is satisfied, a window-pulling operation is performed on the lower bound WINDOW_LOW of the transmission window, that is, WINDOW_LOW=WINDOW_LOW+1:

a retransmission stop timer of a PDU corresponding to the lower bound of the transmission window expires;

a PDU corresponding to the lower bound of the transmission window is retransmitted through N transmission nodes, but fails to be retransmitted, where N is a positive integer; and a PDU corresponding to the lower bound of the transmission window is transmitted successfully.

Based upon the same inventive idea, an embodiment of the invention further provides a transmission device for retransmitting data, and since the device addresses the problem under a similar principle to the method for retransmitting data according to the embodiment of the invention, reference can be made to the implementation of the method for an implementation of the device, and a repeated description thereof will be omitted here.

Figure 7:
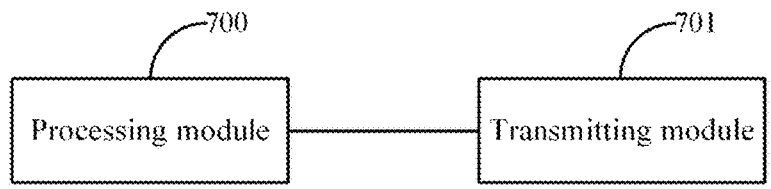
FIG. 7 is a schematic structural diagram of a transmission device for retransmitting data according to an embodiment of the invention.

As illustrated in FIG. 7, the transmission device for retransmitting data according to the embodiment of the invention includes: a processing module 700 and a transmitting module 701, where the processing module 700 and the transmitting module 701 are located at a target protocol layer responsible for managing transmission across transmission nodes.

The processing module 700 is configured to select at least one transmission node for data packets, to be retransmitted, corresponding to a terminal upon determining that a transmission node corresponding to the terminal satisfies a condition for retransmission across transmission nodes.

The transmitting module 701 is configured to retransmit the data packets through the transmission node selected by the processing module.

Optionally, the data packets to be retransmitted include PDUs and/or PDU segments corresponding to the target protocol layer.

Optionally, the transmitting module 701 is configured to transmit the data packets to be retransmitted, to the selected transmission node so that the transmission node transmits the received data packets to be retransmitted.

Optionally the transmission device is a network-side device.

The processing module 700 is further configured to select at least one transmission node for the data, to be retransmitted, corresponding to the terminal upon determining that the terminal supports a function of retransmission across transmission nodes, according to a capability report of the terminal.

Optionally the transmission device is a network-side device.

The processing module 700 is further configured to select at least one transmission node for the data, to be retransmitted, corresponding to the terminal after instructing the terminal to enable a function of uplink and/or downlink retransmission across transmission nodes.

Optionally, the condition for enabling retransmission across transmission nodes includes a part or all of the following conditions:

it is determined that there is a data packet failing to be transmitted, according to a received status report from a lower layer;

it is determined that there is a data packet failing to be transmitted, according to a received status report from a reception device; and it is determined that there is a data packet failing to be transmitted, after a retransmission timer expires.

Optionally, the status report of the reception device is transmitted by a counterpart protocol layer, in the reception device, of the target protocol layer in the transmission device upon reception of a PDU including a probing instruction; or the status report of the reception device is transmitted by a counterpart protocol layer, in the reception device, of the target protocol layer in the transmission device upon detecting a PDU loss; or the status report of the reception device is transmitted by a counterpart protocol layer, in the reception device, of the target protocol layer in the transmission device upon reception of a PDU segment loss indicator transmitted by the lower layer.

Optionally, the status report of the reception device is based upon target protocol layer PDUs, or PDU segments corresponding to the target protocol layer PDUs.

Optionally, the processing module 700 is configured to select at least one of the other transmission nodes corresponding to the terminal than a specific transmission node, where the specific transmission node is a transmission node, which fails to transmit data, and for which a current link has not been resumed.

Optionally, the processing module 700 is further configured to select at least one transmission node for the data packets, to be retransmitted, corresponding to the terminal upon determining that the number of transmission nodes participating in retransmission does not exceed N, where N is a positive integer; and/or to select at least one transmission node for the data packets, to be retransmitted, corresponding to the terminal upon determining that a retransmission stop timer corresponding to the data packets to be retransmitted does not expire.

Optionally, the transmitting module 701 is further configured to select data packets to be initially transmitted, or data packets to be retransmitted, by the transmission node, in a transmission window in an ascending order of their SNs.

Optionally, a lower bound of the transmission window is the sum of the largest one of SNs in data packets decided by the transmission device to discard, and SNs in correctly received data packets, and a step value.

The length of the transmission window is a preset length.

Optionally the processing module 700 is further configured to perform a window pulling operation on the transmission window after a window-pulling condition is satisfied;

where the window-pulling condition is a part or all of the following conditions:

a retransmission stop timer of a PDU corresponding to the lower bound of the transmission window expires;

a PDU corresponding to the lower bound of the transmission window is retransmitted through N transmission nodes, but fails to be retransmitted, where N is a positive integer; and a PDU corresponding to the lower bound of the transmission window is transmitted successfully.

Optionally, the transmitting module 701 is further configured if the data packets to be transmitted include data packets to be initially transmitted, and data packets to be retransmitted, to preferentially transmit the data packets to be retransmitted.

Figure 8:
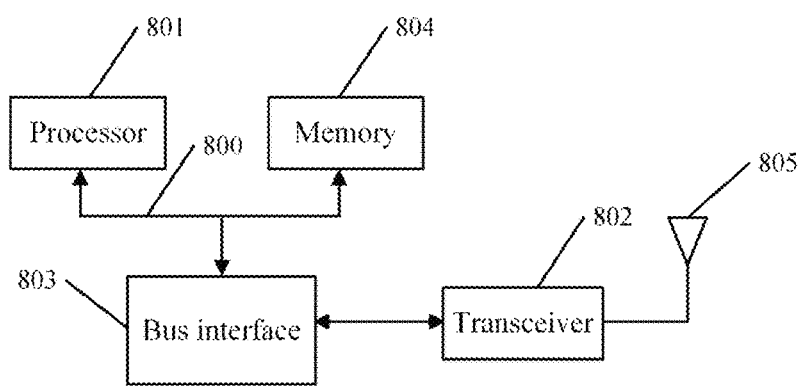
FIG. 8 is a schematic structural diagram of another transmission device for retransmitting data according to an embodiment of the invention.

As illustrated in FIG. 8, another transmission device for retransmitting data according to an embodiment of the invention includes:

a processor 801 located at a target protocol layer responsible for managing transmission across transmission nodes, and configured to read and execute program in a memory 804:

to select at least one transmission node for data packets, to be retransmitted, corresponding to a terminal upon determining that a transmission node corresponding to the terminal satisfies a condition for retransmission across transmission nodes; and to retransmit the data packets through the transmission node selected by the processing module; and a transceiver 802 is configured to receive and transmit data under the control of the processor 801.

Optionally, the data packets to be retransmitted include PDUs and/or PDU segments corresponding to the target protocol layer.

Optionally, the processor 801 is configured to transmit the data packets to be retransmitted, to the selected transmission node so that the transmission node transmits the received data packets to be retransmitted.

Optionally, the transmission device is a network-side device;

the processor 801 is further configured to select at least one transmission node for the data, to be retransmitted, corresponding to the terminal upon determining that the terminal supports a function of retransmission across transmission nodes, according to a capability report of the terminal.

Optionally, the transmission device is a network-side device; and the processor 801 is further configured to select at least one transmission node for the data, to be retransmitted, corresponding to the terminal after instructing the terminal to enable a function of uplink and/or downlink retransmission across transmission nodes.

Optionally, the condition for enabling retransmission across transmission nodes includes a part or all of the following conditions:

it is determined that there is a data packet failing to be transmitted, according to a received status report from a lower layer;

it is determined that there is a data packet failing to be transmitted, according to a received status report from a reception device; and it is determined that there is a data packet failing to be transmitted, after a retransmission timer expires.

Optionally, the status report of the reception device is transmitted by a counterpart protocol layer, in the reception device, of the target protocol layer in the transmission device upon reception of a PDU including a probing instruction; or the status report of the reception device is transmitted by a counterpart protocol layer, in the reception device, of the target protocol layer in the transmission device upon detecting a PDU loss; or the status report of the reception device is transmitted by a counterpart protocol layer, in the reception device, of the target protocol layer in the transmission device upon reception of a PDU segment loss indicator transmitted by the lower layer.

Optionally, the status report of the reception device is based upon target protocol layer PDUs, or PDU segments corresponding to the target protocol layer PDUs.

Optionally, the processor 801 is configured to select at least one of the other transmission nodes corresponding to the terminal than a specific transmission node, where the specific transmission node is a transmission node, which fails to transmit data, and for which a current link has not been resumed.

Optionally, the processor 801 is further configured to select at least one transmission node for the data packets, to be retransmitted, corresponding to the terminal upon determining that the number of transmission nodes participating in retransmission does not exceed N, where N is a positive integer; and/or to select at least one transmission node for the data packets, to be retransmitted, corresponding to the terminal upon determining that a retransmission stop timer corresponding to the data packets to be retransmitted does not expire.

Optionally, the processor 801 is further configured to select data packets to be initially transmitted, or data packets to be retransmitted, by the transmission node, in a transmission window in an ascending order of their SNs.

Optionally, a lower bound of the transmission window is the sum of the largest one of SNs in data packets decided by the transmission device to discard, and SNs in correctly received data packets, and a step value.

The length of the transmission window is a preset length.

Optionally, the processor 801 is further configured to perform a window pulling operation on the transmission window after a window-pulling condition is satisfied;

where the window-pulling condition is a part or all of the following conditions:

a retransmission stop timer of a PDU corresponding to the lower bound of the transmission window expires;

a PDU corresponding to the lower bound of the transmission window is retransmitted through N transmission nodes, but fails to be retransmitted, where N is a positive integer; and a PDU corresponding to the lower bound of the transmission window is transmitted successfully.

Optionally, the processor 801 is further configured if the data packets to be transmitted include data packets to be initially transmitted, and data packets to be retransmitted, to preferentially transmit the data packets to be retransmitted.

In FIG. 8, in the bus architecture (represented as the bus 800), the bus 800 can include any number of interconnecting buses and bridges to particularly link together various circuits including one or more processors represented by the processor 801, and one or more memories represented by the memory 804. The bus 800 can further link together various other circuits, e.g., a peripheral device, a manostat, a power management circuit, etc., all of which are well known in the art, so a further description thereof will be omitted in this context. The bus interface 803 serves as an interface between the bus 800 and the transceiver 802. The transceiver 802 can be an element, or a number of elements, e.g., a number of transmitters and receivers, which are units for communication with various other devices over a transmission medium. Data processed by the processor 801 are transmitted over a wireless medium through the antenna 805, and furthermore the antenna 805 further receives and transports data to the processor 801.

The processor 801 is responsible for managing the bus 800 and performing normal processes, and can further provide various functions of timing, a peripheral interface, voltage regulation, power source management, and other control functions, and the memory 804 can store data for use by the processor 801 in performing the operations.

Optionally, the processor 801 can be a Central Processing Unit (CPU), an Application-Specific Integrated Circuit (ASIC), a Field-Programmable Gate Array (FPGA), or a Complex Programmable Logic Device (CPLD).

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

Correspondingly, the invention can be further embodied in hardware and/or software (including firmware, resident software, microcode, etc.). Still furthermore the invention can be embodied in the form of a computer program product on a computer useable or readable storage medium, where the computer program product includes computer useable or readable program codes embodied in the medium to be used by or in connection with an instruction executing system. In the context of the invention, the computer useable or readable medium can be any medium which can include, store, communicate, transmit, or transport program to be used by or in connection with an instruction executing system, apparatus or device.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for retransmitting data, the method comprising:
   selecting, by a target protocol layer, in a transmission device, responsible for managing transmission across transmission nodes, at least one transmission node for data packets, to be retransmitted, corresponding to a terminal upon determining that a transmission node corresponding to the terminal satisfies a condition for retransmission across transmission nodes; and
   retransmitting, by the target protocol layer in the transmission device, the data packets through a selected transmission node;
   the transmission device being a network-side device; and
   when the transmission device is the network-side device, and before selecting, by the target protocol layer in the transmission device, at least one transmission node for data packets, to be retransmitted, corresponding to the terminal, the method further comprises:
   determining, by the transmission device, whether to transmit data through a plurality of transmission nodes, according to an amount of data of the terminal, and
   upon determining to transmit data through the plurality of transmission nodes for the terminal, determining, by the transmission device, whether to enable a function of uplink and/or downlink retransmission across transmission nodes for the terminal, according to one or a combination of factors comprising:
   a capability of the terminal,
   frequencies corresponding to a plurality of connections for the terminal, and
   a type of traffic for the terminal.

2. The method according to claim 1, wherein the data packets to be retransmitted comprise PDUs and/or PDU segments corresponding to the target protocol layer.

3. The method according to claim 1, wherein the retransmitting, by the target protocol layer in the transmission device, the data packets through the selected transmission node comprises:
   transmitting, by the target protocol layer in the transmission device, the data packets to be retransmitted, to the selected transmission node so that the transmission node transmits the received data packets to be retransmitted.

4. The method according to claim 1, wherein the condition for retransmission across transmission nodes comprises at least one of followings:
   the target protocol layer in the transmission device determines that there is a data packet failing to be transmitted, according to a received status report from a lower layer;
   the target protocol layer in the transmission device determines that there is a data packet failing to be transmitted, according to a received status report from a reception device; or
   the target protocol layer in the transmission device determines that there is a data packet failing to be transmitted, after a retransmission timer expires.

5. The method according to claim 4, wherein the status report of the reception device is transmitted by a counterpart protocol layer, in the reception device, of the target protocol layer in the transmission device upon reception of a PDU comprising a probing instruction; or
   the status report of the reception device is transmitted by a counterpart protocol layer, in the reception device, of the target protocol layer in the transmission device upon detecting a PDU loss; or
   the status report of the reception device is transmitted by a counterpart protocol layer, in the reception device, of the target protocol layer in the transmission device upon reception of a PDU segment loss indicator transmitted by the lower layer.

6. The method according to claim 4 wherein the status report of the reception device is based upon target protocol layer PDUs, or PDU segments corresponding to the target protocol layer PDUs.

7. The method according to claim 1, wherein the selecting, by the target protocol layer in the transmission device, at least one transmission node for data packets, to be retransmitted, corresponding to the terminal comprises:
   selecting, by the target protocol layer in the transmission device, at least one of other transmission nodes corresponding to the terminal than a specific transmission node, the specific transmission node being a transmission node, which fails to transmit data, and of which a current link has not been resumed.

8. The method according to claim 1, further comprises:
   selecting, by the target protocol layer in the transmission device, data packets to be transmitted, by the transmission node, in a transmission window in an ascending order of their SNs;
   the selected data packets to be transmitted are data packets to be initially transmitted, or data packets to be retransmitted;
   a lower bound of the transmission window is a sum of a maximum value and a step value, and the maximum value is a value of SNs corresponding to data packets that have been discarded, and SNs corresponding to data packets that have been correctly received; and
   a length of the transmission window is a preset length;
   wherein the method further comprises:
   performing, by the target protocol layer in the transmission device, a window pulling operation on the transmission window after a window-pulling condition is satisfied;
   wherein the window-pulling condition comprises at least one of followings:
   a retransmission stop timer of a PDU corresponding to the lower bound of the transmission window expires;

a PDU corresponding to the lower bound of the transmission window is retransmitted through N transmission nodes, but fails to be retransmitted, wherein N is a positive integer; or a PDU corresponding to the lower bound of the transmission window is transmitted successfully.

9. The method according to claim 1, further comprises:

when data packets to be transmitted comprise data packets to be initially transmitted, and data packets to be retransmitted, then transmitting, by the transmission device, the data packets to be retransmitted first.

10. A transmission device for retransmitting data, the transmission device comprising:

a processor located at a target protocol layer responsible for managing transmission across transmission nodes, and configured to read and execute program in a memory:

to select at least one transmission node for data packets, to be retransmitted, corresponding to a terminal upon determining that a transmission node corresponding to the terminal satisfies a condition for retransmission across transmission nodes; and to retransmit the data packets through the transmission node selected by the processing module; and a transceiver configured to receive and transmit data under the control of the processor;

the transmission device being a network-side device; and when the transmission device is the network-side device, and before selecting at least one transmission node for data packets, to be retransmitted, corresponding to a terminal, the processor is further configured to read and execute program in the memory:

to determine whether to transmit data through a plurality of transmission nodes, according to amount of data of the terminal, and upon determining to transmit data through the plurality of transmission nodes for the terminal, to determine whether to enable a function of uplink and/or downlink retransmission across transmission nodes for the terminal, according to one or a combination of factors comprising:

a capability of the terminal, frequencies corresponding to a plurality of connections for the terminal, and a type of traffic for the terminal.

11. The transmission device according to claim 10, wherein the data packets to be retransmitted comprise PDUs and/or PDU segments corresponding to the target protocol layer.

12. The transmission device according to claim 10, wherein the processor is configured to read and execute program in the memory:

to transmit the data packets to be retransmitted, to selected transmission node so that the transmission node transmits the received data packets to be retransmitted.

13. The transmission device according to claim 10, wherein the condition for retransmission across transmission nodes comprises at least one of followings:

it is determined that there is a data packet failing to be transmitted, according to a received status report from a lower layer;

it is determined that there is a data packet failing to be transmitted, according to a received status report from a reception device; or it is determined that there is a data packet failing to be transmitted, after a retransmission timer expires.

14. The transmission device according to claim 13, wherein the status report of the reception device is transmitted by a counterpart protocol layer, in the reception device, of the target protocol layer in the transmission device upon reception of a PDU comprising a probing instruction; or the status report of the reception device is transmitted by a counterpart protocol layer, in the reception device, of the target protocol layer in the transmission device upon detecting a PDU loss; or the status report of the reception device is transmitted by a counterpart protocol layer, in the reception device, of the target protocol layer in the transmission device upon reception of a PDU segment loss indicator transmitted by the lower layer.

15. The transmission device according to claim 13, wherein the status report of the reception device is based upon target protocol layer PDUs, or PDU segments corresponding to the target protocol layer PDUs.

16. The transmission device according to claim 10, wherein the processor is further configured to read and execute program in the memory:

to select at least one of the other transmission nodes corresponding to the terminal than a specific transmission node, wherein the specific transmission node is a transmission node, which fails to transmit data, and for which a current link has not been resumed.

17. The transmission device according to claim 10, wherein the processor is further configured to read and execute program in the memory:

to select data packets to be transmitted, by the transmission node, in a transmission window in an ascending order of their SNs;

the selected data packets to be transmitted are data packets to be initially transmitted, or data packets to be retransmitted;

a lower bound of the transmission window is a sum of a maximum value and a step value, and the maximum value is a value of SNs corresponding to data packets that have been discarded, and SNs corresponding to data packets that have been correctly received; and a length of the transmission window is a preset length;

the processor is further configured to read and execute program in the memory:

to perform a window pulling operation on the transmission window after a window-pulling condition is satisfied;

wherein the window-pulling condition comprises at least one of followings:

a retransmission stop timer of a PDU corresponding to the lower bound of the transmission window expires;

a PDU corresponding to the lower bound of the transmission window is retransmitted through N transmission nodes, but fails to be retransmitted, wherein N is a positive integer; and a PDU corresponding to the lower bound of the transmission window is transmitted successfully.

18. The transmission device according to claim 10, wherein the processor is further configured to read and execute program in the memory:

when data packets to be transmitted comprise data packets to be initially transmitted, and data packets to be retransmitted, to transmit the data packets to be retransmitted first.

* * * * *